(12) United States Patent
Chan et al.

(10) Patent No.: US 7,423,947 B2
(45) Date of Patent: Sep. 9, 2008

(54) METHOD AND APPARATUS FOR CD FORMAT DECISION

(75) Inventors: Sai Fan Chan, Kowloon (HK); Tak Wing Lam, Kowloon (HK)

(73) Assignee: Thomson Licensing, Boulogne Billancourt (FR)

( * ) Notice: Subject to any disclaimer, the term of this patent is extended or adjusted under 35 U.S.C. 154(b) by 1346 days.

(21) Appl. No.: 10/355,596

(22) Filed: Jan. 31, 2003

(65) Prior Publication Data

US 2003/0147632 A1 Aug. 7, 2003

(30) Foreign Application Priority Data

Feb. 7, 2002 (EP) .................................. 02290308

(51) Int. Cl.
*G11B 7/00* (2006.01)
(52) U.S. Cl. ............... 369/53.22; 369/47.22; 369/59.25
(58) Field of Classification Search .............. 369/47.27, 369/47.1, 53.2, 53.22, 275.3, 47.21, 47.22, 369/53.1, 59.25, 53.11
See application file for complete search history.

(56) References Cited

U.S. PATENT DOCUMENTS 5,365,507 A * 11/1994 Fuji et al. .................. 369/47.5
5,701,384 A 12/1997 Park ........................... 386/70

FOREIGN PATENT DOCUMENTS

| EP | 0453108 A2 | 10/1991 |
| JP | 10-124988 | 5/1998 |

OTHER PUBLICATIONS

Patent Abstracts of Japan, vol. 18, No. 121, Feb. 25, 1994 & JP 05 307753 of Nov. 19, 1993.
European Search Report of Jul. 10, 2002.

* cited by examiner

*Primary Examiner*—Nabil Z Hindi
(74) *Attorney, Agent, or Firm*—Joseph J. Laks; Paul P. Kiel

(57) ABSTRACT

A method for determining the format of an optical recording medium (1) comprising one or more data or audio tracks or both types of tracks is proposed, the method being robust against partially corrupted data on the recording medium.

The method comprises the steps of:
reading (101) the table of contents (TOC);
storing information from the table of contents;
checking (102, 103, 105) whether all tracks are indicated as audio tracks or as data tracks or whether both audio tracks and data tracks are present;
if one or more data tracks are present, checking (104, 106, 107) whether the first indicated data track contains any audio information; and
determining the format according to the results of the checking steps (102-107).

13 Claims, 3 Drawing Sheets

METHOD AND APPARATUS FOR CD FORMAT DECISION

This application claims the benefit under 35 U.S.C. §365 of European patent application No. 02290308.2 filed Feb. 07, 2002.

FIELD OF THE INVENTION

The present invention relates to a method for determining the format of an optical recording medium comprising one or more data or audio tracks or both types of tracks, and an apparatus for reading from or writing to optical recording media using such method.

BACKGROUND OF THE INVENTION

A common optical recording medium is the well-known compact disk (CD). Over the years CD format has evolved from the initial CDDA audio format (Red Book) to a whole family of formats covering different applications. Some of these formats support a mixture of CDDA format and a variety of data formats on the same disk. Examples for such formats are CD-ROM and CD-ROM-XA. In addition, the music industry has recently released various kinds of audio CD formats such as CD-plus and mix-mode CD. These formats are not totally compliant with the CDDA format. This poses difficulties for multi-format CD players, since the players have to determine the format of the audio content on the optical disk.

Format Definition:

CDDA:

CDDA format is the so-called compact disk and is specified in the IEC 908 standard (known as Red Book format).

CD-ROM/CD-ROM-XA:

The CD-ROM/CD-ROM-XA format describes the extension of CD to store computer data (known as yellow book format).

Mix:

Mix format (so-called mix-mode) comprises a combination of CDDA and CD-ROM/CD-ROM-XA tracks, usually one data track plus up to 98 audio tracks.

Others:

Other formats excluding the above formats.

JP 101 249 78 discloses a method and an apparatus, which allows to discriminate whether a specific track of a CD-ROM is a data track or in fact an audio track conforming to the CDDA format. This discrimination enables a multi-format CD player to reproduce audio tracks stored on the CD-ROM while at the same time preventing the erroneous reproduction of data tracks stored on the CD-ROM, which could otherwise lead to destruction of devices such as loudspeakers connected to the multi-format CD player. The discrimination between both types of tracks is based on additional four-bit control attributes for each track, which are included in the table of contents (TOC) of the disk, indicating if a track is a data track or an audio track. This additional attributes are evaluated by an information class distinction means before starting reproduction of the tracks, and only audio tracks are reproduced. The disclosed method has the disadvantage that if the information in the TOC is partially corrupted for example due to physical damage or errors introduced due to improper master disk production procedures, discrimination between audio tracks and data tracks might fail and some audio tracks might not be reproduced.

SUMMARY OF THE INVENTION

An object of the present invention is to propose a method for determining the format of an optical recording medium that is robust against partially corrupted data on the recording medium. It is another object of the present invention to propose an apparatus for reading from or writing to optical recording media using such method.

According to the invention, a method for determining the format of an optical recording medium comprising a table of contents and one or more data or audio tracks or both types of tracks, comprises the steps of:
  reading the table of contents;
  storing information from the table of contents;
  checking whether all tracks are indicated as audio tracks or as data tracks or whether both audio tracks and data tracks are present;
  if one or more data tracks are present, checking whether the first indicated data track contains any audio information; and
  determining the format according to the results of the checking steps.

The method according to the invention has the advantage that in case one or more tracks are incorrectly indicated as data tracks in the table of contents, e.g. due to physical damage, it is checked whether these tracks are in fact audio tracks. This ensures that all audio tracks of an optical recording medium can be correctly reproduced. The checking step is not necessarily limited to the first indicated data track. It is also possible to check another indicated data track or to check more than one or even all indicated data tracks.

According to a refinement of the invention, the format determining step comprises the steps of:
  determining a first format if all tracks are indicated as audio tracks or if some or all tracks are indicated as data tracks and the first indicated data track contains audio information
  determining a second format if all tracks are indicated as data tracks and the first indicated data track does not contain audio information
  determining a third format if the first track is indicated as data track and does not contain audio information and the remaining tracks are indicated as audio tracks; and
  determining a fourth format in any other case.

In this way all typical formats can be securely determined and a reliable reproduction of the audio tracks is achieved. Again, the checking step is not necessarily limited to the first indicated data track. It is also possible to check another indicated data track or to check more than one or even all indicated data tracks.

Advantageously, the first format is CDDA, the second format is CD-ROM/CD-ROM-XA, the third format is mix-mode and the fourth format is a format different from the first, second and third format. CDDA, CD-ROM/CD-ROM-XA and mix-mode are the most relevant formats. Therefore, a reliable reproduction of most available disks is guaranteed. In case a disk with a different format is determined, a signal indicating a non-reproducible disk may be emitted.

According to an aspect of the invention the decision whether an indicated data track contains audio information is based on a statistical sub-code analysis along the indicated data track, e.g. analysis of the q-code. The q-code not only indicates the timing information on the track, it also indicates whether the track is an audio track or a data track. In normal case, the q-code of an audio track indicates the track is an audio track all along the track. However, the q-code along an audio track could sometimes indicate the track is a data track. Nevertheless, the frequency of audio indications is more than that of data indications. In case of an indicated data track, the q-code of the indicated data track is gathered and the number of "audio" and "data" indications is analysed. If the frequency of audio indications is much larger than that of data indications, it is decided that the indicated data track is actually an audio track. In this way a secure discrimination between both types of tracks is achieved.

According to another aspect of the invention the decision whether an indicated data track contains audio information is based on an audio signal recognition along the track. First the track is treated as if it were an audio track and reproduced internaly without transmitting the reproduced data to the loudspeakers. The frequency spectrum of the reproduced data is analysed. If the spectrum exhibits related harmonics for a predetermined period on different segments of the track, the track is considered an audio track. If the spectrum exhibits rather random harmonics, the track is considered a data track. Alternatively, if the reproduced data gives a waveform with a varying envelope in time domain, the track is considered an audio track. If the waveform envelope is rather constant, than the track is considered a data track. Again, secure discrimination between audio tracks and data tracks is achieved.

Advantageously, the decision process is conducted only on selected portions of the indicated data track. In this way the decision step is sped up, allowing a faster determination of the disk format. For instance the analysis can be conducted on three portions of the track, each consisting of 10 q-code frames, the portions being located in the beginning, middle and end of the track.

Though the invention has so far been described in view of compact disks, it is not limited to this type of storage medium. It is easily applicable to other data storage media. According to the invention, a method for determining the format of a data storage medium, the storage medium comprising information about the stored data and one or more data units of at least a first and a second type, comprises the steps of:

reading the information about the stored data;
checking whether all data units are indicated as being the first type or as being the second type or whether both first type and second type data units are present;
if one or more data units of the second type are present, checking whether the first indicated data unit of the second type contains any data of the first type; and
determining the format according to the results of the checking steps.

Advantageously, an apparatus for deciding the format of an optical recording medium performs a method according to the invention.

According to the invention, a decision engine for determining the format of an optical recording medium comprising a table of contents and one or more data or audio tracks or both types of tracks, comprises an input for receiving information read from the recording medium, a first analyser for storing and analysing the information stored in the table of contents of the recording medium, a second analyser for analysing the information stored in the tracks of the recording medium, a decision logic for determining the format of the recording medium based on the output of the first and the second analyser, a first output for emitting a signal requesting further information to be read from the recording medium, and a second output for emitting a signal indicating the disk format.

Such a decision engine allows to automatically determine the format of an optical recording medium. First the table of contents of the recording medium is analysed. In case a mixture of audio tracks and data tracks is found, more information on the data tracks is requested via the first output. The information reproduced from the indicated data tracks is analysed by the second analyser. Depending on whether the second analyser indicates a data track or an audio track, the decision logic determines the format and emits a signal indicating this format.

Advantageously, the second analyser performs a statistical sub-code analysis along the tracks. In this way a secure discrimination between audio tracks and data tracks is guaranteed. To speed up the discrimination, analysis can be conducted only on a selected portion of the indicated data tracks.

Alternatively, the second analyser performs an audio signal recognition along the tracks or a selected portion of the tracks. In this way, too, a secure discrimination between audio tracks and data tracks is possible.

According to the invention, the decision engine is switchable from an automatic determination mode to a manual mode allowing to select various formats by external means bypassing the automatic determination of the format. This allows a user to speed up the format determination process in case the format is known beforehand.

Advantageously, a decision engine according to the invention is used in an apparatus for reading from or writing to optical recording media. This has the advantage that the apparatus is capable of reproducing disks with a variety of formats even if audio tracks are incorrectly indicated as data tracks in the table of contents.

According to the invention, an apparatus for reading from or writing to optical recording media comprises a plurality of processing blocks for processing the information read from the recording medium in accordance with the format, and a format switch for routing the information read from the recording medium to the corresponding processing block, the format switch being controlled by the output signal of the second output of the decision engine. In this way a specific, well adapted processing block is provided for each format and all formats are correctly reproduced.

BRIEF DESCRIPTION OF THE DRAWINGS

Exemplary embodiments of the invention are specified in the following description of advantageous configurations with reference to the figures. It is understood that the invention is not limited to these exemplary embodiments and that the specified features can also expediently be combined or modified without departing from the scope of the present invention. In the figures.

DETAILED DESCRIPTION OF PREFERRED EMBODIMENTS

Figure 1:
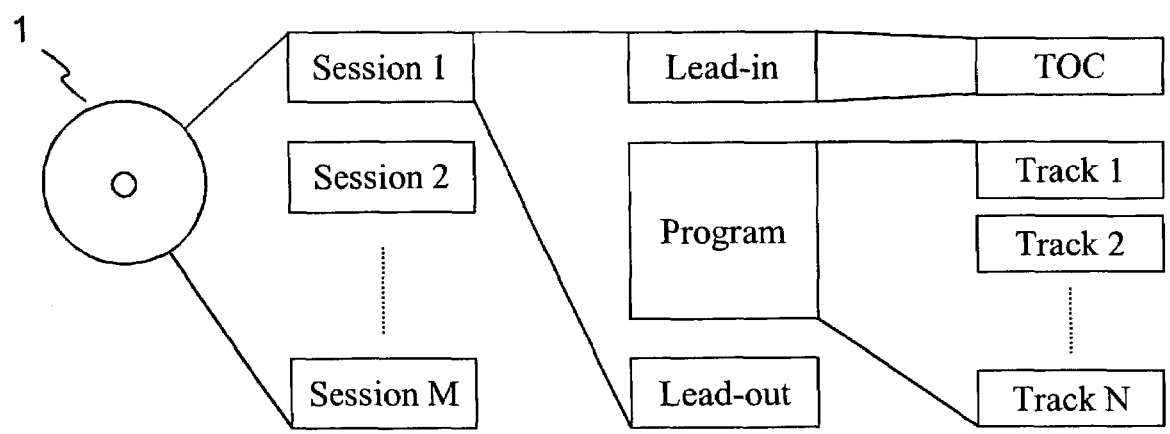
FIG. 1 shows a typical CD data layout.

FIG. 1 shows a typical CD data layout. An optical recording medium 1 usually can have one or more sessions. Each session contains a lead-in, program and lead-out area. The program area contains one or more tracks that can be audio tracks or data tracks. Along the disk, sub-codes are embedded in each area (lead-in, program and lead-out). The table of contents (TOC) is the sub-code located in the lead-in area and contains information about the contents of the session, such as the number of tracks and their attributes and locations.

Figure 2:
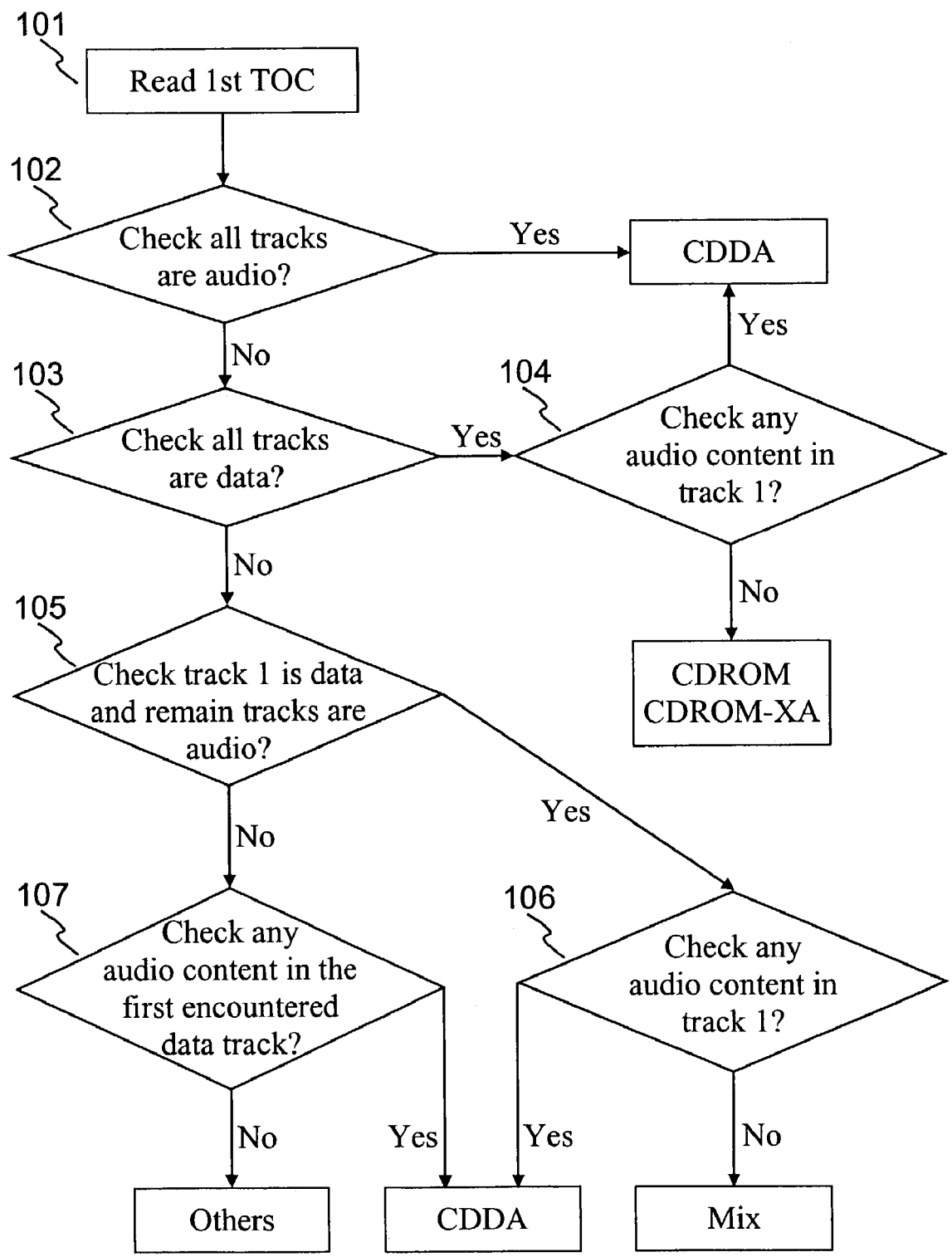
FIG. 2 shows a method to determine the format according to the invention,
FIG. 3 schematically shows an apparatus for reading from or writing to optical recording media according to the invention.

FIG. 2 shows a method to determine the format of an optical recording medium 1 according to the invention. In a step 101 the table of contents TOC of the first session stored on the optical recording medium 1 is read and the following information is stored:

total track number;
location of each track;
attribute of each track (audio or data); and
location of various areas (lead-out, next session etc.).

In the next step 102 it is checked whether all tracks are indicated as audio tracks. This decision can be made based on the attribute data collected in step 101. In case all tracks are indicated as audio tracks, the format is determined to be 'CDDA'.

In case not all tracks are indicated as audio tracks, in a step 103 it is checked whether all tracks are indicated as data tracks. Again, this decision can be made based on the attribute data collected in step 101. If all tracks are indicated as data tracks, in a step 104 it is analysed whether the first track contains any audio information. If this is the case, the format is determined to be 'CDDA'. Otherwise, the format is determined to be 'CD-ROM/CD-ROM-XA'. The decision can either be made based on a statistical q-code analysis along the track or an audio signal recognition process along the track.

If neither all tracks are indicated as audio tracks nor all tracks are indicated as data tracks, in a step 105 it is checked whether the first track is indicated as data track and the remaining tracks are indicated as audio tracks. As before, this decision can be based on the attribute data collected in step 101. If the checking results in 'Yes', in step 106 it is analysed if the first track contains any audio information. In case the first track does contain audio information, the format is determined to be 'CDDA', otherwise the format is determined to be 'mix-mode'. If the checking step 105 results in 'No', in step 107 the first encountered data track is analysed for audio information. The first encountered data track can be identified based on the attribute data collected in step 101. The decision on audio information can again either be made based on a statistical q-code analysis along the indicated data track or an audio signal recognition along the indicated data track. In case the first encountered data track contains audio information, the format is determined to be 'CDDA'. In case it does not contain audio information, the format is determined to be 'Others'.

Figure 3:
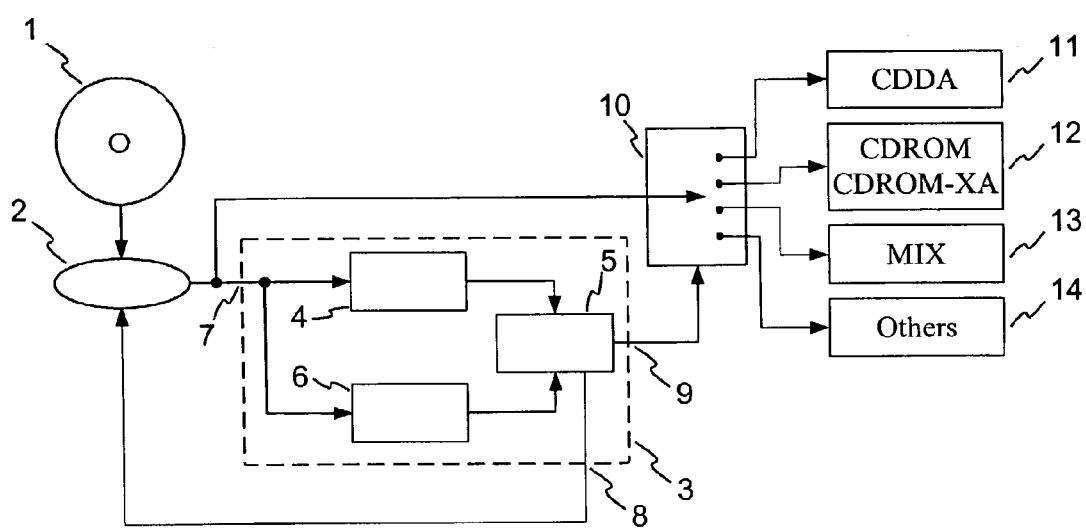

In FIG. 3 an apparatus for reading from or writing to optical recording media according to the invention is shown schematically. When the optical recording medium 1 is inserted in the apparatus, a mechanism is activated to determine the format of the recording medium 1 so that the audio content can be processed accordingly. An optical reader 2 first reads the table of contents TOC sub-code data stored on the recording medium 1 and sends this data via an input 7 to a decision engine 3. The decision engine consists of three processing blocks 4, 5, 6 as shown in the figure. The first processing block is a first analyser 4 for storing and analysing the information stored in the table of contents TOC. After analysis, the analyser 4 sends the results to the second processing block, the decision logic 5. In case a mixture of data tracks and audio tracks is found on the recording medium 1, the decision logic 5 will instruct the optical reader 2 via a first output 8 to send more specific data about the tracks to the decision engine 3. This data is analysed by the third processing block, a second analyser 6 which performs sub-code analysis or audio signal recognition. Analysis results from the second analyser 6 are also sent to the decision logic 5. The decision logic 5 then either instructs the optical reader 2 to send more specific data to the decision engine 3 for further analysis, or reach a decision on the format of the inserted recording medium 1. In the latter case, the decision engine 3 emits a signal via a second output 9 indicating the format. The output signal controls a format switch 10 routing the information read from the recording medium 1 to the corresponding processing block 11, 12, 13, 14.

What is claimed is:

1. A method for determining the format of an optical recording medium comprising a table of contents (TOC) and one or more data or audio tracks or both types of tracks, the method comprising:

reading the table of contents (TOC);
storing information from the table of contents;
checking whether all tracks are indicated as audio tracks or as data tracks or whether both audio tracks and data tracks are present;
if one or more data tracks are present, checking whether the first indicated data track contains any audio information; and
determining a first format if all tracks are indicated as audio tracks or if some or all tracks are indicated as data tracks and the first indicated data track contains audio information; and
determining a second format if all tracks are indicated as data tracks and the first indicated data track does not contain audio information.

2. A method according to claim 1, further comprising:
determining a third format if the first track is indicated as data track and does not contain audio information and the remaining tracks are indicated as audio tracks; and
determining a fourth format in any other case.

3. A method according to claim 2, wherein the first format is CDDA, the second format is CDROM/CDROM-XA, the third format is mix-mode and the fourth format is a format different from the first, second and third format.

4. A method according to claim 1, wherein the decision whether an indicated data track contains audio information is based on a statistical sub-code analysis along the indicated data track.

5. A method according to claim 1, wherein the decision whether an indicated data track contains audio information is based on an audio signal recognition along the track.

6. A method according to claim 4, wherein the decision process is conducted only on selected portions of the track.

7. A method according to claim 5, wherein the decision process is conducted only on selected portions of the track.

8. A decision engine for determining the format of an optical recording medium comprising a table of contents (TOC) and one or more data or audio tracks or both types of tracks, the decision engine comprising an input for receiving information read from the recording medium,
a first analyzer for storing and analyzing the information stored in the table of contents (TOC) of the recording medium,
a second analyzer for analyzing the information stored in the tracks of the recording medium,
a decision logic for determining, based on the output of the first analyzer and the second analyzer, a first format if all tracks are indicated as audio tracks or if some or all tracks are indicated as data tracks, and the first indicated data track contains audio information, and for determining a second format if all tracks are indicated as data tracks and the first indicated data track does not contain audio information, a first output for emitting a signal requesting further information to be read from the recoding medium, and a second output for emitting a signal indicating the format.

9. A decision engine according to claim 8, wherein the second analyzer performs a statistical sub-code analysis along the tracks.

10. A decision engine according to claim 8, wherein the second analyzer performs an audio signal recognition along the tracks.

11. A decision engine according to claim 8, wherein the decision engine can be switched to a manual mode allowing to select various formats by external means bypassing the automatic determination of the format.

12. An apparatus for reading from or writing to optical recording media, comprises a decision engine according to claim 8 for determining the format of an inserted recording medium.

13. An apparatus for reading from or writing to optical recording media according to claim 12, further comprises a plurality of processing blocks for processing the information read from the recording medium in with the format, and a format switch for routing the information read from the recording medium to the corresponding processing block, the format switch being controlled by the output signal of the second output of the decision engine.

* * * * *